US008888145B1

(12) United States Patent
Crompton et al.

(10) Patent No.: US 8,888,145 B1
(45) Date of Patent: Nov. 18, 2014

(54) PRESS FITTING DEVICE, COMPONENTS AND METHOD

(71) Applicant: Quick Fitting, Inc., Warwick, RI (US)

(72) Inventors: David B. Crompton, Tiverton, RI (US); Libardo Ochoa Dias, Pawtucket, RI (US)

(73) Assignee: Quick Fitting, Inc., Warwick, RI (US)

( * ) Notice: Subject to any disclaimer, the term of this patent is extended or adjusted under 35 U.S.C. 154(b) by 0 days.

(21) Appl. No.: 14/061,234

(22) Filed: Oct. 23, 2013

(51) Int. Cl.
*F16L 21/02* (2006.01)
*F16L 17/02* (2006.01)

(52) U.S. Cl.
CPC ............. *F16L 17/02* (2013.01); *F16L 2201/10* (2013.01)
USPC ................. 285/369; 285/382; 285/93; 29/508

(58) Field of Classification Search
USPC .......................... 285/382, 256, 369, 93; 29/508
See application file for complete search history.

(56) References Cited

U.S. PATENT DOCUMENTS

| | | | | |
|---|---|---|---|---|
| 3,064,983 | A * | 11/1962 | Halterman | 285/369 |
| 3,066,961 | A * | 12/1962 | Gerin | 285/369 |
| 3,885,821 | A * | 5/1975 | Philibert | 285/382 |
| 3,915,480 | A * | 10/1975 | Kish et al. | 285/369 |
| 4,275,909 | A * | 6/1981 | Yoshizawa et al. | 285/345 |
| 4,466,640 | A * | 8/1984 | Van Houtte | 285/369 |
| 4,880,260 | A * | 11/1989 | Gotoh et al. | 285/382.2 |
| 5,108,134 | A * | 4/1992 | Irwin | 285/382.7 |
| 6,012,743 | A * | 1/2000 | Godeau et al. | 285/382 |
| 6,805,385 | B2 * | 10/2004 | Viegener | 285/382.2 |
| 6,843,516 | B2 * | 1/2005 | Bishop et al. | 285/382 |
| 7,178,836 | B2 * | 2/2007 | Hoff et al. | 285/256 |
| 7,823,932 | B2 * | 11/2010 | Webb et al. | 285/382 |
| 7,954,861 | B2 * | 6/2011 | Swift et al. | 285/382 |
| 8,118,331 | B2 * | 2/2012 | Yamashita et al. | 285/256 |
| 8,439,404 | B2 * | 5/2013 | Anton et al. | 285/93 |
| 8,517,431 | B2 * | 8/2013 | Arning et al. | 285/382 |
| 8,585,100 | B2 * | 11/2013 | Stults et al. | 285/382 |

* cited by examiner

*Primary Examiner* — David E Bochna
(74) *Attorney, Agent, or Firm* — Williams Mullen, PC; Thomas F. Bergert

(57) ABSTRACT

A pipe fitting and method therefor includes one or more indicators to provide a visual indication that the fitting has been properly pressed around a tube and that the correct amount of pressure has been provided to create a permanent seal. In embodiments, the present invention includes a fitting having a main body component with at least a first segment having an axially inner portion, an axially intermediate portion and an axially outer portion, with a retaining compartment defined therein. The retaining compartment can retain one or more sealing rings, including an indicator sealing ring having an indicator flange extending from its outer surface. An external indicator band can be securely retained around the external surface of the pipe fitting, and can be adapted to change color upon receiving sufficient force, thereby indicating that the fitting has been properly pressed.

29 Claims, 11 Drawing Sheets

PRESS FITTING DEVICE, COMPONENTS AND METHOD

TECHNICAL FIELD

The present invention relates to fluid flow systems, and more particularly to press fittings with visual indicators for use in fluid flow systems.

BACKGROUND

Piping systems exist to facilitate the flow of fluids (e.g., liquid, steam, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert gases, cleaning chemicals, waste water, plant cooling water and paint and coatings are just some examples of the types of fluids and gases that can be deployed through piping systems. Tubing and piping types can include, for example, copper, stainless steel, CPVC; (chlorinated polyvinyl chloride) and PEX (cross-linked polyethylene). For purposes of the present disclosure, the term "pipe" or "piping" will be understood to encompass one or more pipes, tubes, piping elements and/or tubing elements.

Piping connections are necessary to join various pieces of pipe and must be versatile in order to adapt to changes of pipe direction required in particular piping system implementations. For example, fittings and valves may be employed at the ends of open pieces of pipe that enable two pieces of pipe to fit together in a particular configuration. Among fitting types there are elbows, "tees", couplings adapted for various purposes such as pipe size changes, ends, ball valves, stop valves, and partial angle connectors, for example.

In the past, pipe elements have been traditionally connected by welding and/or soldering them together using a torch. Soldering pipe fittings can be time-consuming, unsafe, and labor intensive. Soldering also requires employing numerous materials, such as copper pipes and fittings, emery cloths or pipe-cleaning brushes, flux, silver solder, a soldering torch and striker, a tubing cutter and safety glasses, for example. The process for soldering pipes can proceed by first preparing the pipe to be soldered, as the copper surface must be clean in order to form a good joint. The end of the pipe can be cleaned on the outside with emery cloth or a specially made wire brush. The inside of the fitting must be cleaned as well. Next, flux (a type of paste) can be applied to remove oxides and draw molten solder into the joint where the surfaces will be joined. The brush can be used to coat the inside of the fitting and the outside of the pipe with the flux. Next, the two pipes are pushed together firmly into place so that they "bottom out"—i.e., meet flush inside the fitting. The tip of the solder can be bent to the size of the pipe in order to avoid over-soldering. With the pipes and fitting in place, the torch is then ignited with the striker or by an auto-strike mechanism to initiate soldering. After heating for a few moments, if the copper surface is hot enough such that it melts when touched by the end of the solder, the solder can then be applied to the joint seam so that it runs around the joint and bonds the pipe and fitting together.

In addition to welding methods, pipe elements have been secured together through pressure. A press fitting, which is also known as a friction fit or an interference fit, is a fastening of parts that takes place through friction after the parts are pushed or compressed together, as opposed to being connected by threads, glue, solder or other methods. Press fittings of fluid flow parts such as plumbing parts can be created by force, through the use of a hand tool, for example. Hand tools, often called press tools, can take the form of a pair of movably engaged jaws similar to a pair of pliers, for example, where the jaws have a head portion of a certain size designed to fit around parts that are to be connected. For instance, a pipe can be inserted into a fitting made of a somewhat compressible material, whereupon pressure can be applied through the press tool to the outside of the fitting in order to compress the fitting around the pipe. It is critical that the press tool be appropriately applied around the entire circumference of the fitting in order to ensure a tight connection. Once connected, the parts can be used for various purposes. In the field of fluid flow, the connected parts can be used to direct the flow of fluids, such as gases, water and other liquids as described above.

Traditional press fittings are frequently improperly sealed or only partially sealed. If an installer has not properly pressed the fitting to provide a permanent seal, fluid can leak, causing great damage and cost. Imperfections or scarring in the tubing being inserted also presents an opportunity for the connection to leak following compression. In many installation environments, installers take work breaks or otherwise become distracted as to which of a number of press fittings have been properly compressed and which have been either improperly compressed or not at all. When this happens, there has been no simple and fast way (other than catastrophic failure or leakage) to determine which fittings have been properly pressed, which can result in lost time spent determining which fittings need to be pressed or in damage in the application environment.

The present invention, in part, assists in providing one or more visual indicators to assist an individual in determining whether a piping element such as a fitting has been pressed, and whether the correct amount of force has been applied to create a positive and/or permanent seal. For purposes of the present disclosure, it will be appreciated that a fitting can encompass a valve member and other piping elements including, but not limited to: a coupling joint, an elbow joint, a tee joint, a stop end, a ball valve member, tubing and other objects having cylindrical openings. In embodiments of the present invention, a fitting is provided having a main body component, with an interior indicator securely maintained against a portion of the interior wall of the main body component, and an exterior indicator securely maintained against a portion of the exterior wall of the main body component. The interior indicator (which can also be referred to as a membrane seal, indicator seal and/or indicator membrane, for example) is expandable when properly compressed so as to extend outside of the fitting around an inserted pipe. The external indicator is compressible so as to change color when proper pressure has been applied. In this way, an installer, inspector or other individual can visually determine very quickly whether a press fitting has been compressed, and whether there is a proper and complete seal. In various embodiments, the interior indicator has an inner lip that, when compressed, provides a secondary wiper seal that fills voids, scarring or imperfections in the tubing being inserted as well as in the fitting wall.

DETAILED DESCRIPTION OF EMBODIMENTS OF THE PRESENT INVENTION

Figure 1:
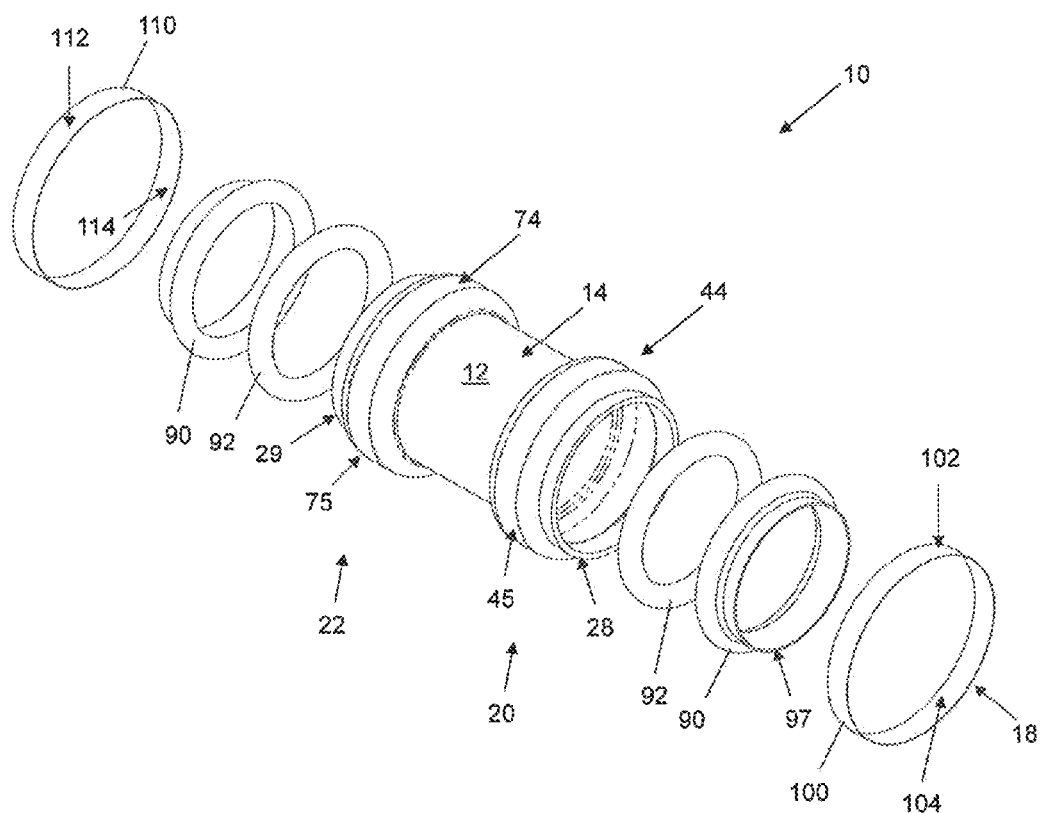
FIG. 1 shows an exploded perspective view of a fitting and components in accordance with one embodiment of the present invention.
Figure 2:
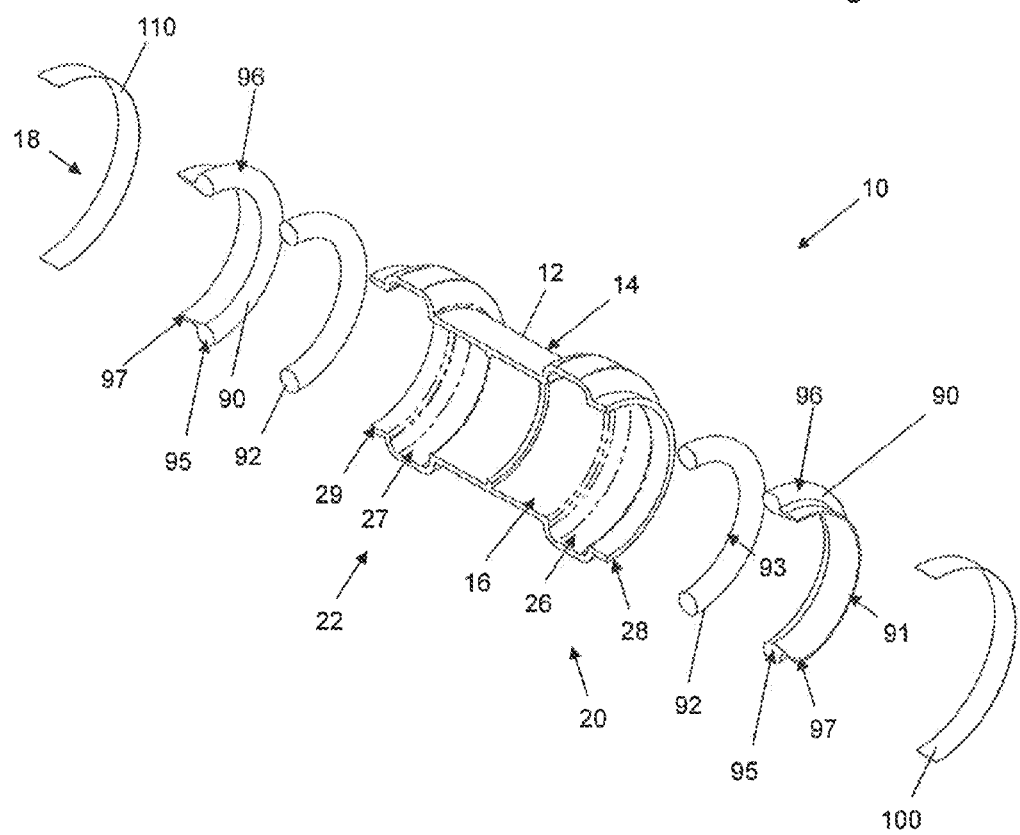
FIG. 2 shows an exploded cross-sectional view of a fitting and components of FIG. 1.
Figure 3:
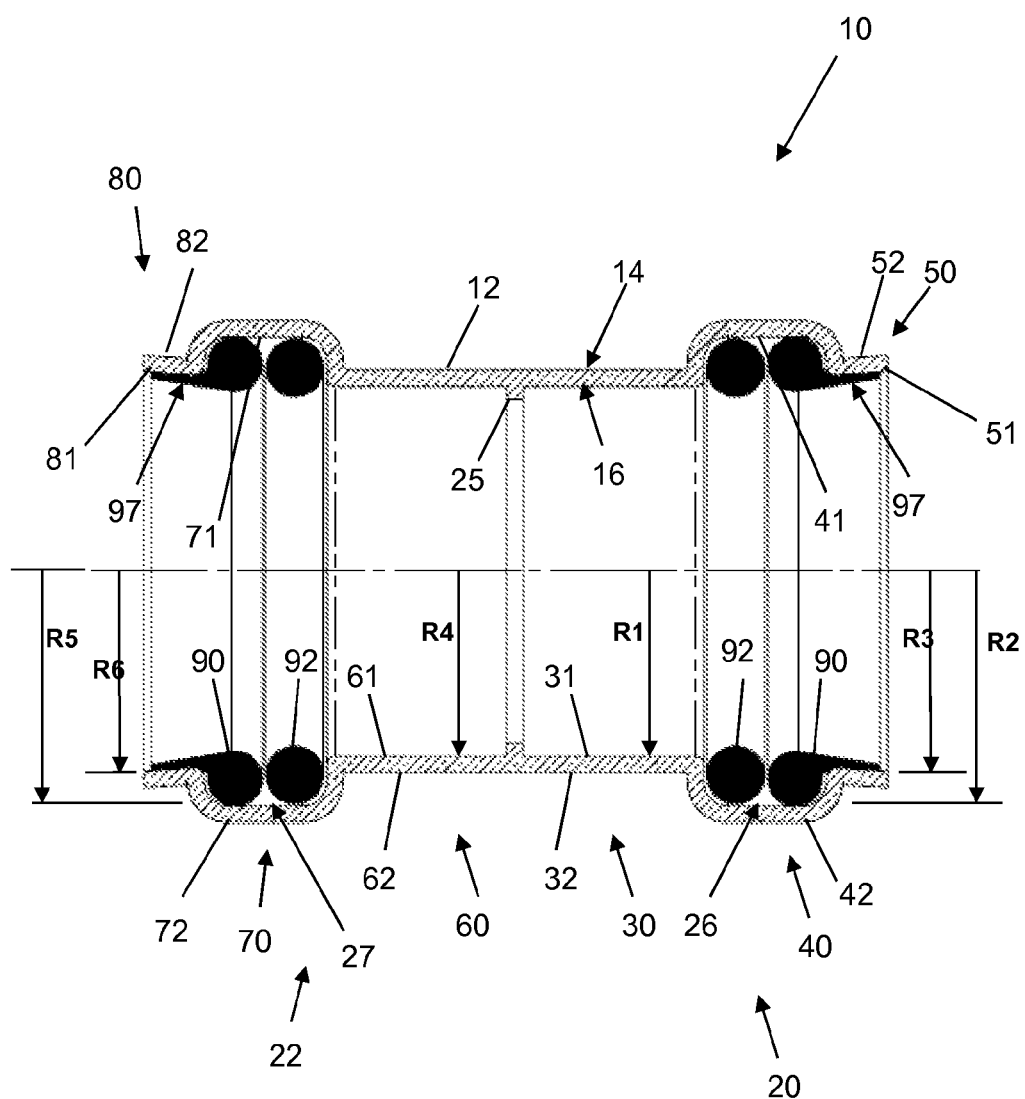
FIG. 3 shows a front cross-sectional view of one embodiment of the present invention with sealing members installed and no exterior indicator.

As shown in FIGS. 1 through 5, the present invention provides a fitting 10 having a main body component 12 with an interior wall 14 and an exterior wall 16. In one embodiment, the fitting 10 can be formed (e.g., forged, cast, extruded, pressed) in brass, aluminum, steel, malleable iron or copper, with full porting and full flow fitting, for example. The interior wall 14 defines a cavity 18 extending axially through the main body component 12, wherein the main body component 12 includes first 20 and second 22 segments. As shown in FIG. 3, the first segment 20 includes an axially inner portion 30, axially intermediate portion 40 and axially outer portion 50. The first segment axially inner portion 30 includes an interior wall 31, exterior wall 32 and radius R1. The first segment axially intermediate portion 40 includes an interior wall 41, exterior wall 42 and radius R2. The first segment axially outer portion 50 includes an interior wall 51, exterior wall 52 and radius R3.

As shown in the embodiment of the present invention of FIG. 3, the second segment 22 also includes an axially inner portion 60, axially intermediate portion 70 and axially outer portion 80. The second segment axially inner portion 60 includes an interior wall 61, exterior wall 62 and radius R4. The second segment axially intermediate portion 70 includes an interior wall 71, exterior wall 72 and radius R5. The second segment axially outer portion 80 includes an interior wall 81, exterior wall 82 and radius R6. It will be appreciated that embodiments of the present invention may provide a fitting having only a first segment with such an arrangement.

As shown in FIGS. 2 and 3, the respective interior walls 31, 61 of the axially inner portions 30, 60 of the first 20 and second 22 segments are separated by a tube stop element 25 extending radially into the cavity 18, with the radius R2 of the axially intermediate portion 40 of at least the first segment 20 being larger than the radius R1 of the axially inner portion 30 and the radius R3 of the axially outer portion 50, so as to form a retaining compartment 26. Similarly, with the second segment 22, the radius R5 of the axially intermediate portion 70 is larger than the radius R4 of the axially inner portion 60 and the radius R6 of the axially outer portion 80, so as to form a retaining compartment 27 in the second segment 22. It will be appreciated that embodiments of the present invention may provide a fitting having only a first segment with such an arrangement.

In embodiments of the present invention, as illustrated in FIG. 1, for example, the exterior wall 42 of the axially intermediate portion 40 of the first segment 20 of the main body component 12 has a depressed central segment 44 forming a groove 45 extending circumferentially around the exterior wall 42 of the axially intermediate portion 40. A similar depressed central segment 74 forms a groove 75 extending circumferentially around the exterior wall 72 of the axially intermediate portion 70 of the second segment 22, in the embodiment of the invention shown in FIG. 1. However, it will be appreciated that embodiments of the present invention may provide a fitting having only a first segment with such an arrangement.

In embodiments of the present invention as illustrated in FIGS. 1 and 2, the axially outer portion 50 of the first segment 20 terminates in an axially outer rim 28. Further, the axially outer portion 50 of the first segment 20 can be provided in a fluted form, whereby its radius R3 increases as the axially outer portion 50 extends axially outwardly from the axially intermediate portion 40 of the first segment 20. In similar fashion, the axially outer portion 80 of the second segment 22 can terminate in an axially outer rim 29, and can be provided in fluted form, whereby the radius R6 increases as the axially outer portion 80 extends axially outwardly from the axially intermediate portion 70 of the second segment 20. By providing fluted axially outer portions 50, 80, the present invention permits easier ingress and egress of a fluid pipe or tube into the main body portion 12 of the fitting 10, while also providing an expanding surface area for the indicator sealing ring to expand into as one or more pipes or tubes (illustrated at 11 in FIGS. 4 and 5) are inserted, as explained in more detail hereinafter. It will be appreciated that embodiments of the present invention may provide a fitting having only a first segment with such an arrangement.

In embodiments of the present invention, as illustrated in FIGS. 1 through 7, an interior indicator 90 and/or an exterior indicator 100 are provided in order to provide a visual indication to an installer, inspector or other person that the present invention has been pressed and that the correct amount of pressure has been applied to create a positive connection, i.e., a permanent seal. One or both such indicators can appear on a first segment 20 of the fitting in accordance with embodiments of the present invention, or on multiple segments of the fitting in accordance with other embodiments of the present invention.

As shown in FIGS. 1, 2, 4 and 5, an exterior indicator band 100 is securely retainable within the groove 45 of the first segment 20, and a separate exterior indicator band 110 is securely retainable within the groove 75 of the second segment 22. Each of the indicator bands 100, 110 has a respective radially outer surface 102, 112 and a respective radially inner surface 104, 114, wherein the radially outer surface 102, 112 is compressible and capable of changing color upon receiving sufficient external pressure. In embodiments of the present invention, manual pressure from an individual is not significant enough to compress either of the outer surfaces 102, 112 so as to cause the color to change, and an external press tool is required. Each of the indicator bands 100, 110 can be formed as a ring-shaped band of a film-like material, through a casting process or three-dimensional printing process, for example. The film-like material can be laminated into a thin label, which can be applied to the fitting body surface using an adhesive. When the appropriate force is applied to the indicator band, two separate films compress together to yield a die or ink resulting in the desired color. The radially inner surface 104, 114 can be provided with adhesive during application, or prior to application with a type of peel-off backing to cover the adhesive surface until such time as the indicator band is to be securely retained within one or more grooves (e.g., 45, 75).

As shown in FIGS. 1 through 7, an interior indicator is provided in the form of an indicator sealing ring 90, which can be formed of a rubber-based material or similar rigid yet deformable material designed to slightly compress when pressure is applied. In various embodiments of the present invention, the indicator sealing ring 90 is adaptable to extend axially outwardly of the axially outer rim 28 when compressed by an inserted pipe or tube. A non-indicator sealing ring 92 is also shown, and the non-indicator sealing ring 92 can be formed of the same material as described above in connection with sealing ring 90. Both rings 90, 92, have solid cores having a substantially ring shaped center forming respective openings 91, 93 therein. As shown in FIG. 3, the non-indicator sealing ring 92 is at least partially positionable within the retaining compartment 26, and the indicator sealing ring 90 is positionable adjacent the non-indicator sealing ring 92 and at least partially within the retaining compartment 26. A separate indicator sealing ring 90 and non-indicator sealing ring 92 can be similarly positionable with respect to each other and within retaining compartment 27 of the second segment 22, as shown in FIG. 3. The indicator sealing ring 90 has a main portion 95 with an outer surface 96, and includes an indicator flange 97 extending from the outer surface 96.

Figure 6:
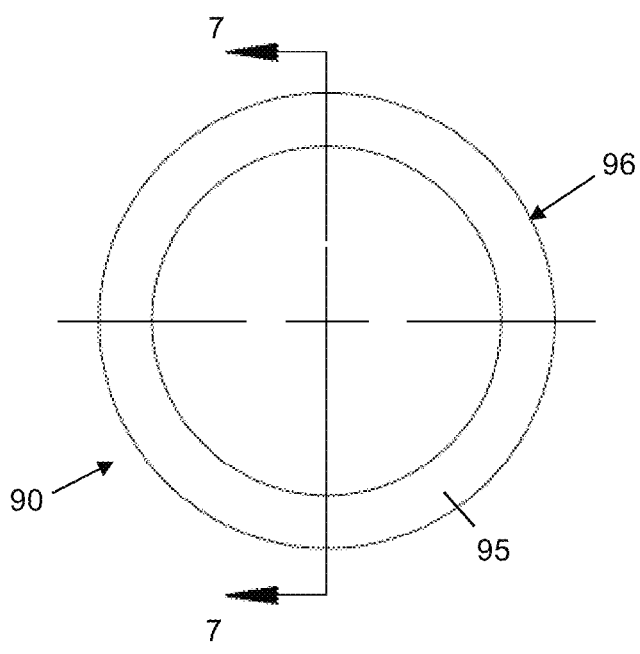
FIG. 6 shows a front view of one embodiment of an indicator sealing ring in accordance with the present invention.
Figure 7:
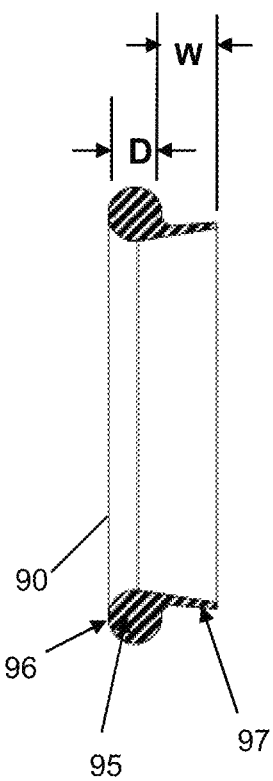
FIG. 7 shows a cross-sectional view of one embodiment of the indicator sealing ring taken along line 7-7 of FIG. 6.

In embodiments of the present invention, as shown in FIGS. 2, 6 and 7, the non-indicator sealing ring 92 is substantially circular in cross-section whereas the indicator sealing ring 90 is not substantially circular in cross-section, due to the flange member 97. Further, the indicator sealing ring 90 can abut at least a portion of the interior wall 41 of the axially intermediate portion 40 and at least a portion of the interior wall 51 of the axially outer portion 50 of the first segment 20. Similarly, sealing ring 90 can abut at least a portion of the interior wall 71 of the axially intermediate portion 70 and at least a portion of the interior wall 81 of the axially outer portion 80 of the second segment 22.

Figure 4:
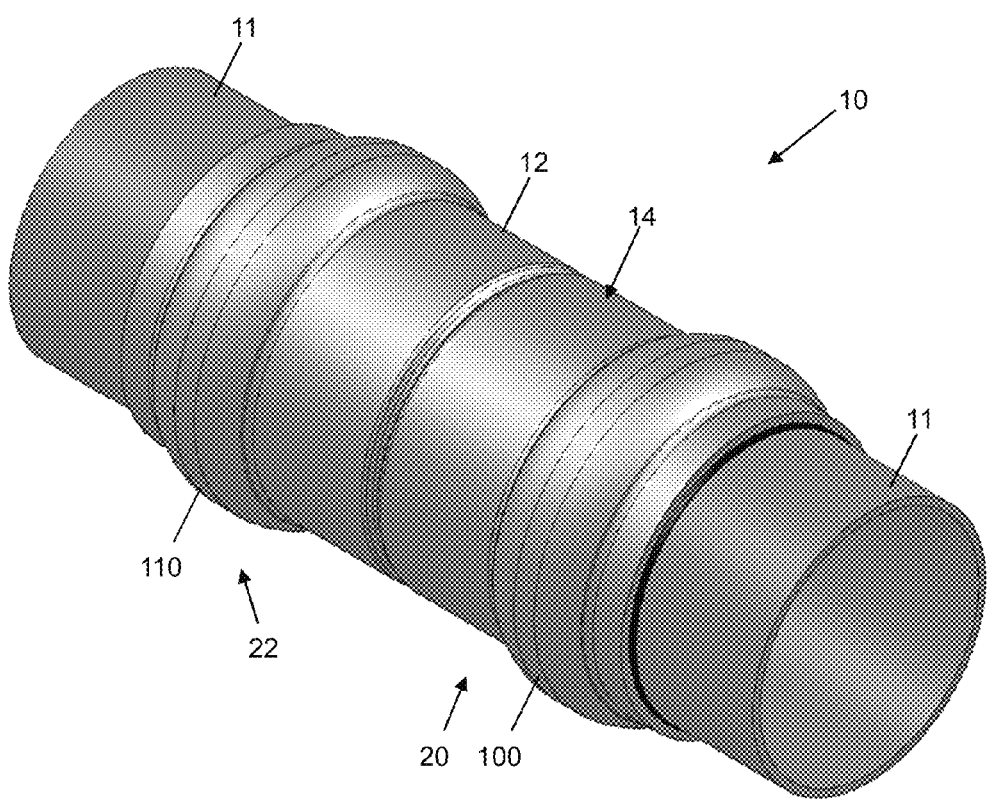
FIG. 4 shows a perspective view of one embodiment of the device of the present invention with pipe elements inserted therein.
Figure 5:
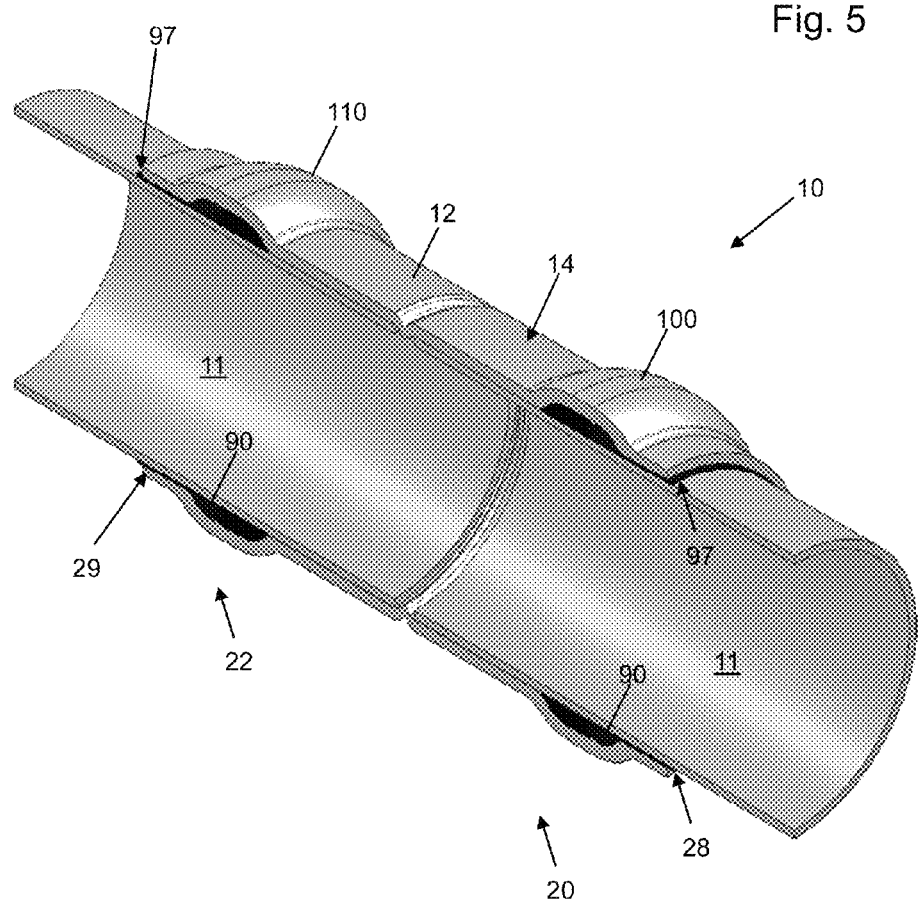
FIG. 5 shows a cross-sectional view of one embodiment of the device of the present invention taken along the line 5-5 of FIG. 4.
Figure 16:
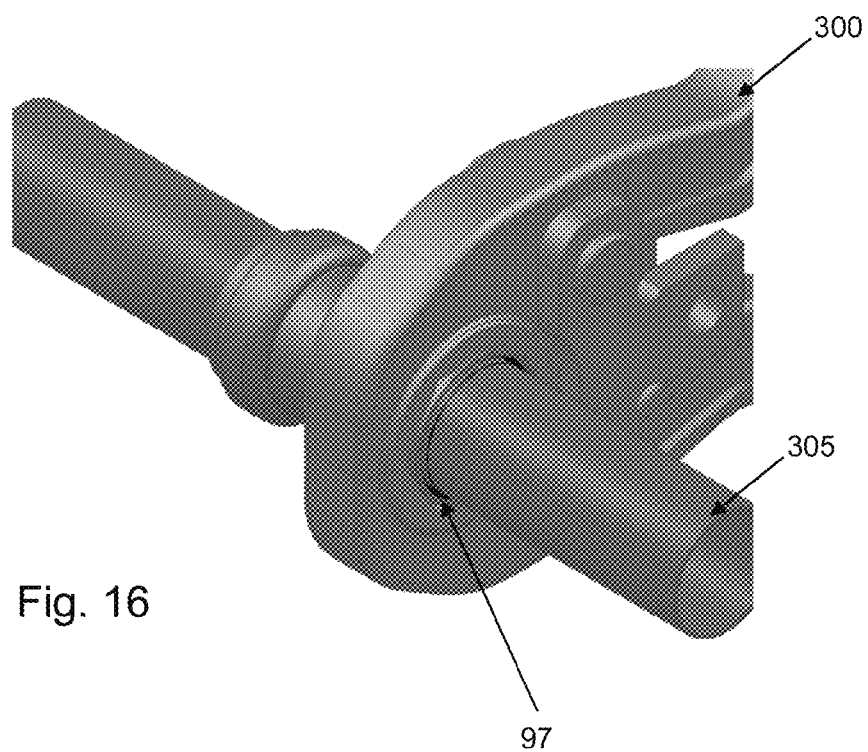
FIG. 16 shows a perspective view of a press tool being applied around one embodiment of the present invention with a pipe or tube element insert therein.

In operation, a press tool 300 can be applied around the fitting 10 when a pipe or tube 305 has been inserted into the cavity 18, as shown in FIG. 16, and specifically around the exterior indicator 100. In embodiments of the present invention where two exterior indicators 100, 110 are provided, the press tool can be sequentially applied around both indicators in turn. As the press tool is properly applied, the exterior indicator 100 (and/or 110) is compressed such that the radially outer surface 102 (112 when indicator 110 is being compressed) changes color, indicating positions along the indicator where the fitting has been pressed. In addition to compressing the exterior indicator, as the press tool is properly applied, the flange 97 of sealing ring 90 can be compressed and squeezed so as to extend along the interior wall 51 of the axially exterior portion 50 and ultimately extend outside of the outer rim 28 so as to be visible. With respect to second segment 22, the flange 97 of sealing ring 90 can be compressed and squeezed so as to extend along the interior wall 81 of the axially exterior portion 80 and outside of the outer rim 29 so as to be visible. FIGS. 4 and 5 shown flange elements 97 of respective indicator sealing rings 90 extended outside of the outer rims 28, 29. In various embodiments of the present invention, the radius R3 of the axially outer portion 50 of the first segment 20 is greater than the radius R1 of the axially inner portion 30 of the first segment 20, and the radius R6 of the axially outer portion 80 of the second segment 22 is greater than the radius R4 of the axially inner portion 60 of the second segment 22. In this way, slightly extra space is provided between an inserted tube and the respective interior walls 51, 81 of the axially outer portions 50, 80, facilitating the expansion of the flange portions 97 of the sealing rings 90 outside of the outer rims 28, 29 of the fitting.

As shown in FIG. 7, the indicator sealing ring flange 97 has a width W and the indicator sealing ring main portion 95 has a diameter D, and the flange width W is substantially equal to or greater than the main portion diameter D when the indicator sealing ring 90 is in the resting position. Among other things, this arrangement can assist the indicator sealing ring flange in having sufficient expandable material in order to appropriately extrude outside of the fitting when a tube is inserted, while also filling in voids, scarring or imperfections in the tubing being inserted as well as in the fitting wall.

It will thus be appreciated that a single application of the press tool about the circumference of the axially intermediate portion 50 of the first segment 20 of the fitting 12 can act to simultaneously compress the exterior indicator 100 and the interior indicator sealing ring 90 with flange 97. If the exterior indicator 100 shows color around the entire circumference, then an individual will know that the fitting has been pressed. Further, if the flange 97 of the interior indicator sealing ring 90 has extruded outward of the outer rim 28 of the first segment 20 entirely around the circumference of the fitting, then an individual will know that the fitting has been properly sealed.

In another embodiment of the present invention, as shown in FIGS. 8 through 15, the fitting 210 includes external 212 and internal 214 surfaces, with a passageway extending through the internal surface. The fitting further includes first 120 and second 122 segments, with at least the first segment 120 including an axially inner portion 130, axially intermediate portion 140 and axially outer portion 150. The first segment axially inner portion 130 includes an interior wall 131, exterior wall 132 and radius R11. The first segment axially outer portion 150 includes an interior wall 151, exterior wall 152 and radius R12. The first segment axially intermediate portion 140 includes an interior wall 141, exterior wall 142 and radii R13 and R14. The exterior wall 142 has a staggered formation including a primary rounded surface 143 and a secondary rounded surface 144. The interior wall 141 is similarly staggered, with a deeper indentation shown in the primary interior surface 145 (with corresponding radius R13) and a shallower indentation in the secondary interior surface 146 (with corresponding radius R14). The primary 145 and secondary 146 surfaces form a retaining compartment 129 and are separated by a lip 147, which assists in retaining sealing members as described hereinafter. The primary surface 145 forms a first retaining compartment section 126 and the secondary surface 146 forms a second retaining compartment section 127.

While the embodiment of the present invention as shown in FIGS. 8 through 15 shows a second segment 122 as essentially a mirror image of first segment 120, and separated by a tube stop element 125, it will be appreciated that embodiments of the present invention may provide a fitting having only a first segment with such an arrangement, and the second segment 122 may alternatively be formed differently in order to adapt to different operating environments for the present invention.

Figure 10:
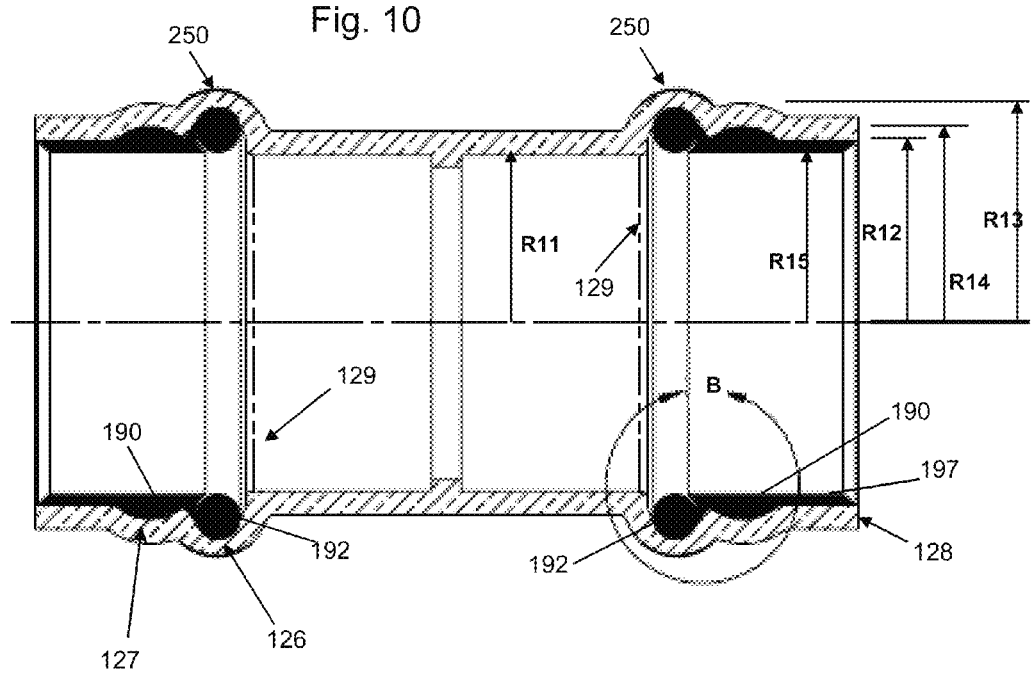
FIG. 10 shows a front cross-sectional view of one embodiment of the present invention with sealing members and exterior indicators installed.
Figure 11:
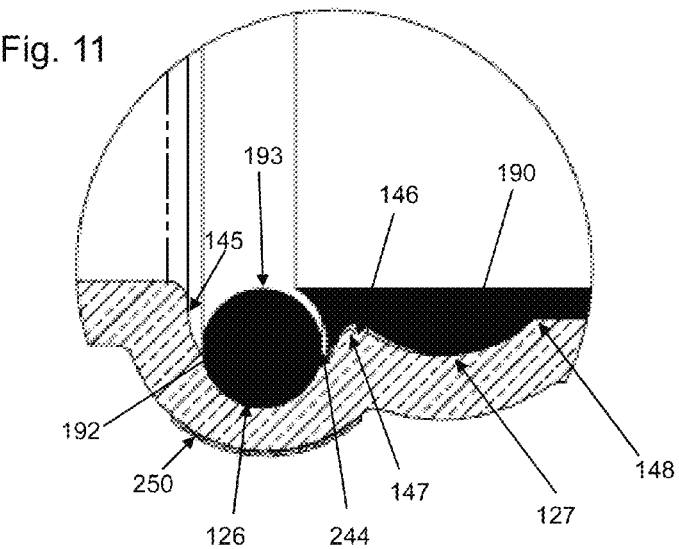
FIG. 11 is a detailed view of encircled portion B of FIG. 10.

As shown in FIGS. 10 and 11, the radius R13 of the axially intermediate portion 140 of at least the first segment 120 is larger than radii R11, R12 and R14. Further, radius R14 of the axially intermediate portion 140 of the first segment 120 is larger than the radii R11 and R12. Further, radius R12 is larger than R11. This arrangement facilitates several measures in this embodiment of the present invention, as the larger radii R13 and R14 form retaining compartment sections 126, 127 for sealing members 190, 192 as described elsewhere herein, the radius R11 facilitates a solid, inflexible interior wall portion 131 of the fitting 210 in order to securely retain inserted tubing, and the radius R12 provides adequate spacing to accommodate sealing member 190 with flange element 197. In one embodiment of the present invention, the radius R15 to the installed sealing member 190 is larger than radius R11, which provides a slight amount of space for the sealing member 190 to expand radially inwardly as a tubing member is inserted into the fitting. Additionally, the lip 147 can be formed so as to be radially outward of a cusp element 148 of the secondary interior surface 146. In this way, as a tubing element is inserted into the fitting, the secondary sealing ring 190 will be influenced to flex axially, including axially outwardly of the outer rim 128, and axially inwardly over the primary sealing ring 192, thereby facilitating a smooth insertion and transition of the tubing element into the axially inner portion 130 of the fitting 210.

In embodiments of the present invention as illustrated in FIGS. 8 through 11, 14 and 15, the axially outer portion 150 of the first segment 120 terminates in an axially outer rim 128. Further, the axially outer portion 150 of the first segment 120 can be provided in a fluted form, whereby its radius R12 increases as the axially outer portion 150 extends axially outwardly from the axially intermediate portion 140 of the first segment 120, as described above in connection with the embodiments of the present invention shown in FIGS. 1 through 7.

In embodiments of the present invention, as illustrated in FIGS. 8 through 15, an interior indicator membrane 190 and/or an exterior indicator 250 are provided in order to provide a visual indication to an installer, inspector or other person that the present invention has been pressed and that the correct amount of pressure has been applied to create a positive connection, i.e., a permanent seal. One or both such indicators 190, 250 can appear on a first segment 120 of the fitting 210 in accordance with embodiments of the present invention, or on multiple segments 120, 122 of the fitting 210 as shown in the embodiments of the present invention shown in FIGS. 14 and 15.

Figure 8:
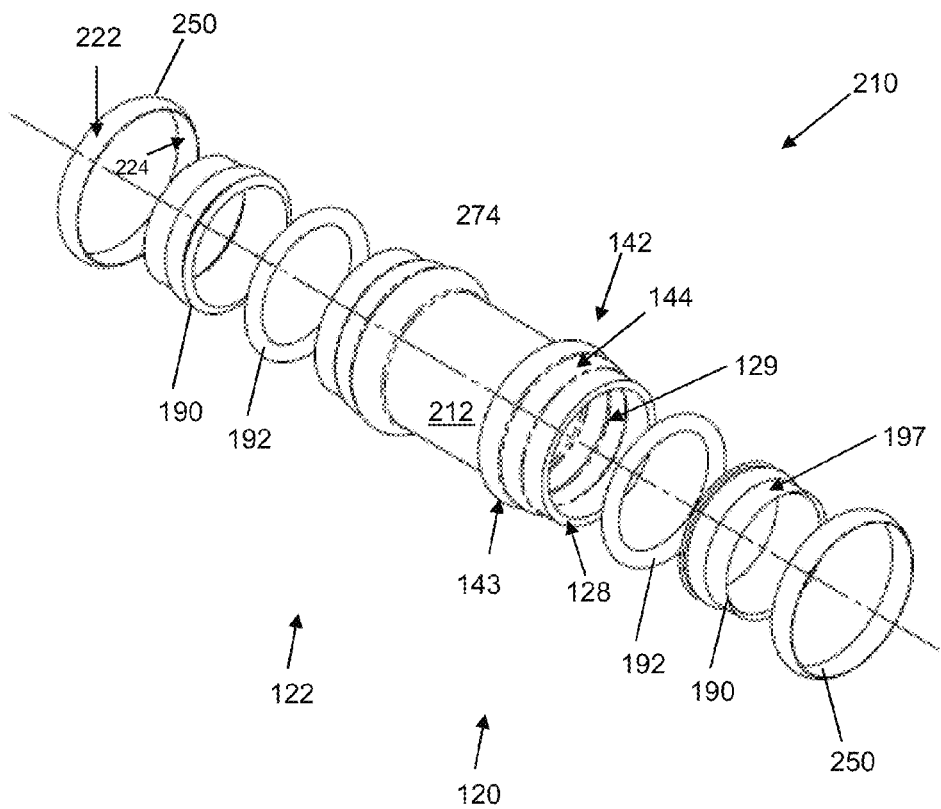
FIG. 8 shows an exploded perspective view of a fitting and components in accordance with another embodiment of the present invention.
Figure 9:
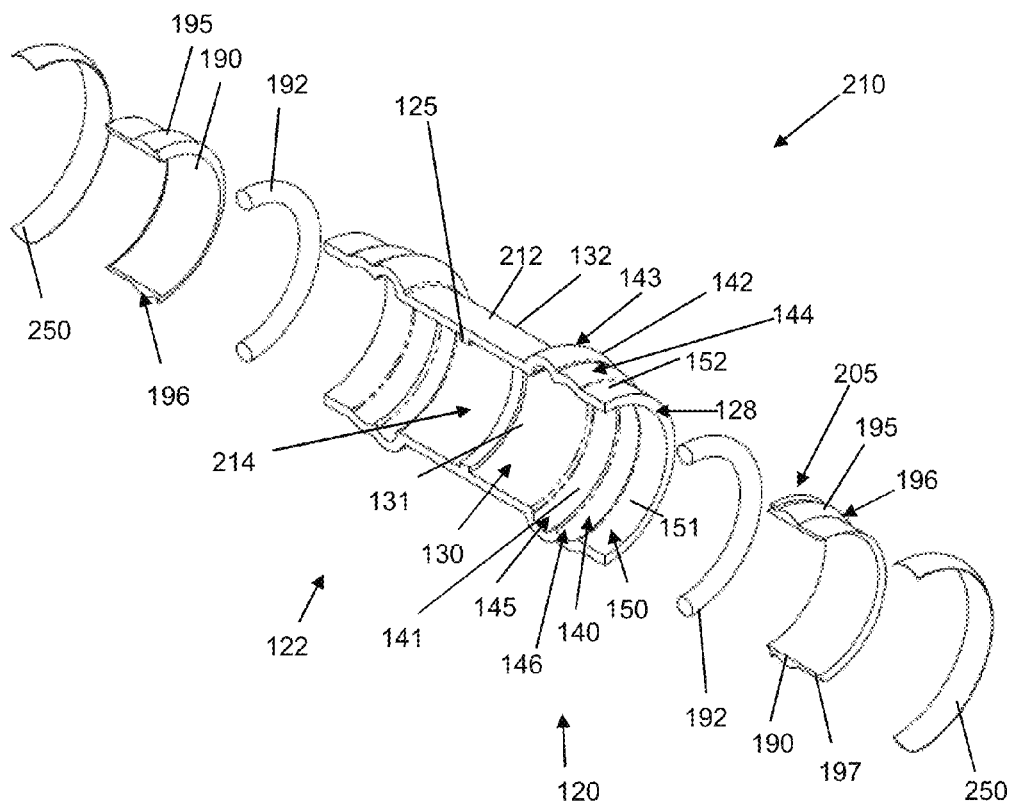
FIG. 9 shows an exploded cross-sectional view of a fitting and components of FIG. 7.
Figure 12:
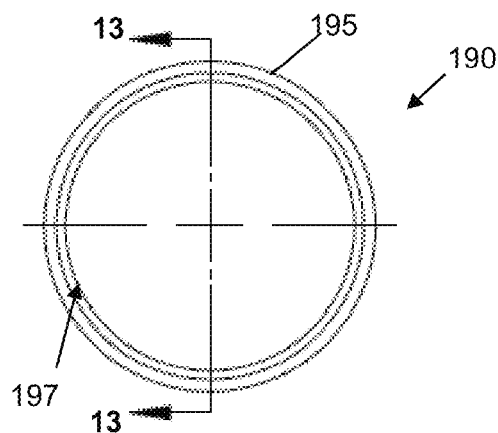
FIG. 12 shows a front view of one embodiment of an indicator sealing ring in accordance with the present invention.
Figure 13:
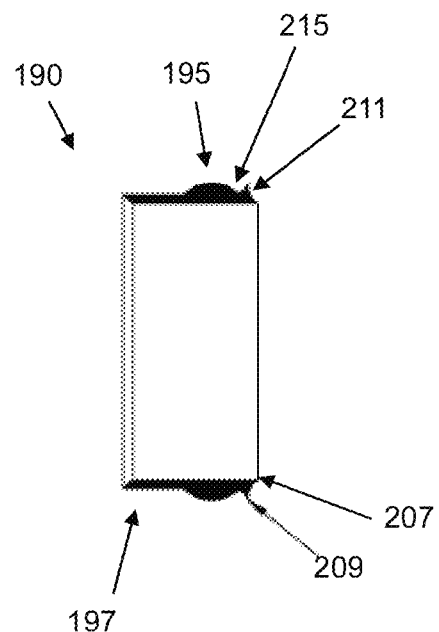
FIG. 13 shows a cross-sectional view of the embodiment of the indicator sealing ring taken along the line 13-13 of FIG. 12.
Figure 14:
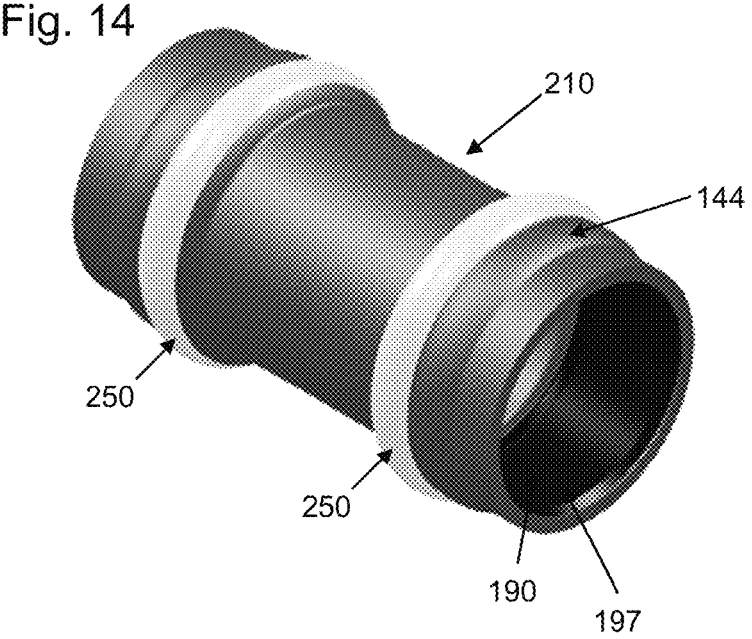
FIG. 14 shows a perspective view of a fitting with indicator components installed in accordance with one embodiment of the present invention.
Figure 15:
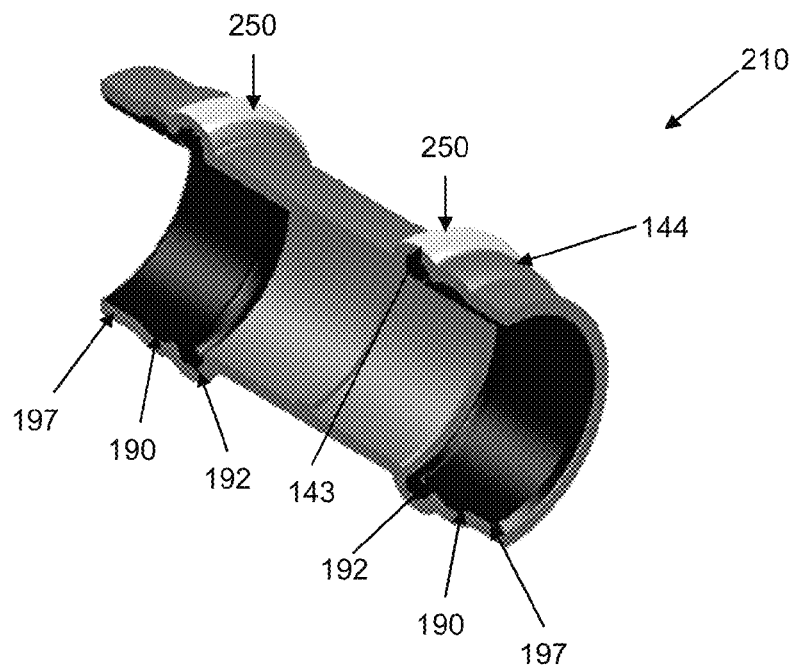
FIG. 15 shows a cross-sectional view of a fitting and components of FIG. 14.

As shown in FIGS. 8 through 15, the interior indicator membrane is provided in the form of an indicator sealing ring 190, which can be formed of a rubber-based material or similar rigid yet deformable material designed to slightly compress when force is applied. In various embodiments of the present invention, the indicator sealing ring 190 is adaptable to extend axially outwardly of the axially outer rim 128 when compressed by an inserted pipe or tube, as well as axially inwardly around and over non-indicator sealing ring 192, which can be formed of the same material as described above in connection with sealing ring 190. Both rings 190, 192, can be provided with solid cores having a substantially ring shaped center forming respective openings extending axially therethrough. As shown in FIGS. 10 and 11, the non-indicator sealing ring 192 is at least partially positionable within the primary retaining compartment section 126 of the retaining compartment 129, and the indicator sealing ring 190 is positionable adjacent the non-indicator sealing ring 192 and at least partially within the secondary retaining compartment section 127 of the retaining compartment 129. A separate indicator sealing ring 190 and non-indicator sealing ring 192 can be similarly positionable with respect to each other and within retaining compartment 129 of the second segment 122, as shown in FIGS. 8 through 10. As shown in FIGS. 8 through 13, the indicator sealing ring 190 has a main portion 195 with an outer surface 196, and includes an indicator flange 197 extending from the outer surface 196. When installed, and prior to insertion of any tubing into the fitting, the indicator flange 197 extends axially outwardly towards the outer rim 128 of the fitting. In addition to flange 197, the indicator sealing ring 190 includes a sealing extender portion 205 extending from the outer surface 196 in a direction substantially opposite the direction in which flange 197 extends from the main or body portion 195 of the indicator ring 190. In one embodiment of the present invention, as shown in FIGS. 11 through 13, the sealing extender portion 205 includes a radially inner lip 207 and a radially outer lip 209, with the lips 207 and 209 comprising the outer edges of an external curved wall 211. The external curved wall 211 is adapted to engage sealing ring 192 during operation. In one embodiment of the present invention, as shown in FIG. 11, the external curved wall 211 does not engage sealing ring 192 in the resting position, and there may be a gap 244 in between rings 190, 192 as shown in FIG. 11, but the curved wall 211 is adapted to engage the sealing ring 192 upon flexing inwardly as a tube member is installed in the fitting. Further, as the indicator sealing ring 190 is expanded during insertion of a tubing member, the lip 207 is adapted to be pushed axially inwardly of the fitting and over the radially innermost portion 193 of sealing ring 192, such that an inserted tube does not actually touch the sealing ring 192 upon insertion. In this way, the present invention facilitates smooth insertion and removal of tubing into the fitting, while minimizing potential issues with friction, scarring and other surface issues that may otherwise occur with a tubing element transitioning across multiple interior surfaces.

As further shown in FIGS. 11 through 13, the indicator sealing ring 190 is provided with an inner curved wall 215 for engaging the lip 147 and a portion of the first retaining compartment section 126. The inner curved wall 215 assists in retaining the indicator ring 190 in place during operation. In one embodiment of the present invention, the lip 207 resides axially inwardly of lip 209 in order to adapt to the positioning of sealing ring 192 and to facilitate the axially extending movement of ring 190 during insertion of a tubing element as described elsewhere herein.

In embodiments of the present invention, as shown in FIGS. 8 through 13, the non-indicator sealing ring 192 is substantially circular in cross-section whereas the indicator sealing ring 190 is not substantially circular in cross-section, due to the flange member 197, sealing extender portion 205 and curved walls 211, 215. Further, the indicator sealing ring 190 can abut at least a portion of the first retaining compartment section 126 and at least a portion of the interior wall 151 of the axially outer portion 150 of the first segment 120. In addition, the durometer, or degree of hardness, of the sealing ring 190 can be different from that of sealing ring 192. In particular embodiments of the present invention, the durometer of sealing ring 190 is less than the durometer of sealing ring 192, which provides sealing ring 190 with slightly more flexibility, compressibility and deformability for extending axially in both directions during insertion of a tubing element into the fitting 112. In this way, the sealing ring 190 can flex more than ring 192 to facilitate both proper sealing and proper visual indication as described elsewhere herein.

As shown in FIGS. 8 through 11, 14 and 15, an exterior indicator band 250 is securely affixed around the primary rounded surface 143 of the exterior wall 142 of the axially intermediate portion 140 of the first segment 120 of the fitting 210. In this embodiment, the exterior band 250 is not maintained within a groove of the outer wall of the fitting so as to maintain a constant profile, but is rather atop the surface 143. Nevertheless, it will be appreciated that a groove can be provided in the exterior wall 142 of the fitting 210 in order to receive the indicator band 250 while maintaining a constant profile, similar to that shown in the embodiment of the present invention shown in FIGS. 4 and 5. Indicator band 250 has a radially outer surface 222 and a radially inner surface 224, wherein the radially outer surface 222 is compressible and capable of changing color upon receiving sufficient external force. In embodiments of the present invention, manual force from an individual is not significant enough to compress the outer surface 222 so as to cause the color to change, and an external press tool is required. The radially inner surface 224 can be provided with adhesive during application, or prior to application with a type of peel-off backing to cover the adhesive surface until such time as the indicator band is to be securely applied to the exterior wall 142. In the embodiment of the present invention with substantially mirror image second portion 122 of the fitting 210, a corresponding indicator band 250 is provided. Each of the indicator bands 250 can be formed as a ring-shaped band of a film-like material, through a casting process or three-dimensional printing process, for example. The film-like material can be laminated into a thin label, which can be applied to the fitting body surface using an adhesive. When the appropriate force is applied to the indicator band, two separate films compress together to yield a die or ink resulting in the desired color.

In operation, a press tool is applied around the fitting 210 when a pipe or tube has been inserted into the cavity, and specifically around the exterior indicator 250. The operation of the press tool can be similar to that described above in connection with the embodiment of the present invention in FIGS. 1 through 7 and 16, for example. In embodiments of the present invention where two exterior indicators are provided, the press tool can be sequentially applied around both indicators in turn. As the press tool is properly applied, the exterior indicator 250 is compressed such that the radially outer surface 224 changes color, indicating positions along the indicator where the fitting has been pressed. In addition to compressing the exterior indicator, as the press tool is properly applied, the flange 197 of sealing ring 190 can be compressed and squeezed so as to extend along the interior wall 151 of the axially exterior portion 150 and ultimately extend outside of the outer rim 128 so as to be visible. Similar operations can be employed with respect to second segment 122.

It will be appreciated that the indicator sealing ring 190 can be of sufficient durometer and have sufficient expandable material in order to appropriately extrude outside of the fitting when a tube is inserted, while also filling in voids, scarring or imperfections in the tubing being inserted as well as in the fitting wall. The indicator sealing ring 190 can also be of sufficient durometer in order to roll up or pinch when a pipe or tube is improperly inserted, such as when the pipe or tube is inserted at too oblique an angle into the fitting.

It will further be appreciated that a single application of a suitable press tool about the circumference of the axially intermediate external wall portion 143 of the first segment 120 of the fitting 210 can act to simultaneously compress the exterior indicator 250 and the interior indicator sealing ring 190 with flange 197 and extender portion 205. If the exterior indicator 250 shows color around the entire circumference, then the fitting can be visually confirmed to have been properly pressed. Further, if the flange 197 of the interior indicator sealing ring 190 has extruded outward of the outer rim 128 of the first segment 120 entirely around the circumference of the fitting, then an individual will know that the fitting has been properly sealed.

It will be apparent that methods of providing a fitting in accordance with the present invention include providing a main body component with walls, segments and portions as identified above, positioning a non-indicator sealing ring at least partially within the retaining compartment of the main body component, and positioning an indicator sealing ring adjacent the non-indicator sealing ring and at least partially within the retaining compartment, wherein the indicator sealing ring has a main portion with an outer surface, and includes an indicator flange extending from the outer surface. Methods further include forming the exterior wall of the axially intermediate portion of the first segment of the main body component so as to have a depressed central segment forming a groove extending circumferentially around the exterior wall of the axially intermediate portion, and further securing an indicator band within the groove.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A fitting, comprising:
a main body component having an interior wall and an exterior wall, wherein the interior wall defines a cavity extending axially through the main body component, wherein the main body component includes a first segment having an axially inner portion, an axially intermediate portion and an axially outer portion, with the axially inner portion, axially intermediate portion and axially outer portion being integrally formed and each having a respective interior wall, exterior wall and a radius, with the radius of the axially intermediate portion is larger than the radius of the axially inner portion and the radius of the axially outer portion, so as to form a retaining compartment;
a non-indicator sealing ring at least partially positionable within the retaining compartment; and
an indicator sealing ring positionable so as to abut the non-indicator sealing ring and maintained at least partially within the retaining compartment, wherein the indicator sealing ring has a main portion with an outer surface, and includes an indicator flange extending from the outer surface.

2. The fitting of claim 1 wherein the non-indicator sealing ring is substantially circular in cross-section and the indicator sealing ring is not substantially circular in cross-section.

3. The fitting of claim 1 wherein the indicator sealing ring abuts at least a portion of the interior wall of the axially intermediate portion and at least a portion of the interior wall of the axially outer portion of the first segment.

4. The fitting of claim 3 wherein the axially outer portion of the first segment terminates in an axially outer rim, and wherein the indicator sealing ring is adaptable to extend axially outwardly of the axially outer rim.

5. The fitting of claim 1 wherein the indicator sealing ring is provided in a different color from the non-indicator sealing ring.

6. The fitting of claim 1 wherein the exterior wall of the axially intermediate portion of the first segment of the main body component has a depressed central segment forming a groove extending circumferentially around the exterior wall of the axially intermediate portion.

7. The fitting of claim 6, further including an indicator band securely retainable within the groove.

8. The fitting of claim 7, wherein the indicator band has a radially outer surface and a radially inner surface, wherein the radially outer surface is compressible and capable of changing color upon receiving sufficient external pressure.

9. The fitting of claim 6 wherein the exterior wall of the axially intermediate portion includes a primary rounded surface and a secondary rounded surface.

10. The fitting of claim 1 wherein the radius of the axially outer portion of the first segment is greater than the radius of the axially inner portion of the first segment.

11. The fitting of claim 1 wherein the radius of the axially outer portion of the first segment increases as the axially outer portion extends axially outwardly from the axially intermediate portion of the first segment.

12. The fitting of claim 1 wherein the retaining compartment comprises a first retaining compartment section and a second retaining compartment section axially outwardly of the first retaining compartment section, with the first retaining compartment section having a first section radius and the second retaining compartment section having a second section radius, and wherein the first section radius is larger than the second section radius.

13. The fitting of claim 12 wherein the axially intermediate portion includes a radial inner lip separating the first retaining compartment section from the second retaining compartment section.

14. The fitting of claim 1 wherein the indicator sealing ring flange has a width and the indicator sealing ring main portion has a diameter, and further wherein the flange width is substantially equal to or greater than the main portion diameter when the indicator sealing ring is in the resting position.

15. The fitting of claim 1 wherein the indicator sealing ring further includes a sealing extender portion extending from the outer surface, with the sealing extender portion including a radially inner lip and a radially outer lip, with the lips comprising the outer edges of an external curved wall.

16. A method of providing a fitting, comprising:
providing a main body component having an interior wall and an exterior wall, wherein the interior wall defines a cavity extending axially through the main body component, wherein the main body component includes a first segment having an axially inner portion, an axially intermediate portion and an axially outer portion, with the axially inner portion, axially intermediate portion and axially outer portion being integrally formed and each having a respective interior wall, exterior wall and a radius, with the radius of the axially intermediate portion is larger than the radius of the axially inner portion and the radius of the axially outer portion, so as to form a retaining compartment;
positioning a non-indicator sealing ring at least partially within the retaining compartment; and
positioning an indicator sealing ring so as to abut the non-indicator sealing ring and at least partially within the retaining compartment, wherein the indicator sealing ring has a main portion with an outer surface, and includes an indicator flange extending from the outer surface.

17. The method of claim 16 wherein the non-indicator sealing ring is substantially circular in cross-section and the indicator sealing ring is not substantially circular in cross-section.

18. The method of claim 16 wherein the indicator sealing ring abuts at least a portion of the interior wall of the axially intermediate portion and at least a portion of the interior wall of the axially outer portion of the first segment.

19. The method of claim 18 wherein the axially outer portion of the first segment terminates in an axially outer rim, and wherein the indicator sealing ring is adaptable to extend axially outwardly of the axially outer rim.

20. The method of claim 16 wherein the exterior wall of the axially intermediate portion of the first segment of the main body component is formed so as to have a depressed central segment forming a groove extending circumferentially around the exterior wall of the axially intermediate portion.

21. The method of claim 20, further including the step of securing an indicator band within the groove.

22. The method of claim 20 wherein the indicator band has a radially outer surface and a radially inner surface, wherein the radially outer surface is compressible and capable of changing color upon receiving sufficient external pressure.

23. The method of claim 16 wherein the radius of the axially outer portion of the first segment is greater than the radius of the axially inner portion of the first segment.

24. The method of claim 16 wherein the radius of the axially outer portion of the first segment increases as the axially outer portion extends axially outwardly from the axially intermediate portion of the first segment.

25. The method of claim 16 wherein the indicator sealing ring flange has a width and the indicator sealing ring main portion has a diameter, and further wherein the flange width is substantially equal to or greater than the main portion diameter when the indicator sealing ring is in the resting position.

26. A fitting, comprising:
a main body component having an axially outer rim, an interior wall and an exterior wall, wherein the interior wall defines a cavity extending axially through the main body component;
an interior indicator securely maintained against a portion of the interior wall and adaptable to extend axially outwardly of the axially outer rim; and
an exterior indicator securely maintained against a portion of the exterior wall, wherein the interior indicator includes a body portion that is substantially circular in cross-section, a flange portion extending from the body portion and a sealing extender portion extending from the body portion, wherein the sealing extender portion includes a radially inner lip and a radially outer lip, with the lips comprising the outer edges of an external curved wall.

27. The fitting of claim 26 wherein the interior indicator is expandable upon compression.

28. The fitting of claim 26 wherein the exterior indicator is capable of changing color upon compression.

29. A method of providing a fitting, comprising:
provide a main body component having an axially outer rim, an interior wall and an exterior wall, wherein the interior wall defines a cavity extending axially through the main body component;
positioning an interior indicator in the cavity so as to be securely maintained against a portion of the interior wall and adaptable to extend axially outwardly of the axially outer rim; and
affixing an exterior indicator around a portion of the exterior wall, wherein the interior indicator includes a body portion that is substantially circular in cross-section, a flange portion extending from the body portion and a sealing extender portion extending from the body portion, wherein the sealing extender portion includes a radially inner lip and a radially outer lip, with the lips comprising the outer edges of an external curved wall.

* * * * *